(12) United States Patent
Clouser et al.

(10) Patent No.: US 6,607,125 B1
(45) Date of Patent: Aug. 19, 2003

(54) HANDHELD MERCHANDISE SCANNER DEVICE

(75) Inventors: Paul Lee Clouser, Raleigh, NC (US); Frank Eliot Levine, Austin, TX (US); Danny Marvin Neal, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/450,985

(22) Filed: Nov. 29, 1999

(51) Int. Cl.$^7$ ................................................. G06K 7/10
(52) U.S. Cl. ............. 235/383; 235/462.45; 235/472.01
(58) Field of Search ................................ 235/383, 381, 235/462.45, 462.46, 378, 472.01, 472.02, 385

(56) References Cited

U.S. PATENT DOCUMENTS

| | | |
|---|---|---|
| 4,779,706 A | 10/1988 | Mergenthaler |
| 5,083,638 A | 1/1992 | Schneider |
| 5,115,888 A | 5/1992 | Schneider |
| 5,123,494 A | 6/1992 | Schneider |
| 5,168,961 A | 12/1992 | Schneider |
| 5,239,167 A | 8/1993 | Kipp |
| 5,250,789 A | 10/1993 | Johnsen |
| 5,393,965 A | 2/1995 | Bravman et al. |
| 5,494,136 A | 2/1996 | Humble |
| 5,497,853 A | 3/1996 | Collins, Jr. et al. |
| 5,540,301 A | 7/1996 | Dumont |
| 5,635,906 A | 6/1997 | Joseph |
| 5,649,114 A | 7/1997 | Deaton et al. |
| 5,804,807 A * | 9/1998 | Murrah et al. ............... 235/383 |
| 5,825,002 A * | 10/1998 | Roslak ........................ 235/375 |
| 5,855,007 A | 12/1998 | Jovicic et al. |
| 5,884,281 A | 3/1999 | Smith et al. |
| 5,975,416 A * | 11/1999 | Chow et al. ................. 235/383 |
| 5,978,772 A | 11/1999 | Mold |
| 5,979,758 A | 11/1999 | Swartz et al. |
| 6,189,789 B1 * | 2/2001 | Levine et al. ................ 235/383 |
| 6,424,262 B2 * | 7/2002 | Garder et al. ............. 340/572.3 |

FOREIGN PATENT DOCUMENTS

EP 0448536 * 3/1991 ........... G08B/13/24

* cited by examiner

*Primary Examiner*—Daniel St. Cyr
(74) *Attorney, Agent, or Firm*—Marilyn Smith Dawkins; Bracewell & Patterson, L.L.P.

(57) ABSTRACT

An improved handheld merchandise scanning device and method are disclosed. A first and second mode are enabled in the scanning device for scanning a product tag which includes product information and a security tag. The product tag is scanned utilizing the scanning device in the first mode to obtain the product information without deactivating the security tag. The product tag is scanned utilizing the scanning device in the second mode to concurrently obtain the product information and deactivate the security tag.

28 Claims, 4 Drawing Sheets

HANDHELD MERCHANDISE SCANNER DEVICE

CROSS-REFERENCE TO RELATED APPLICATIONS

The present invention is related to the subject matter of co-pending patent application Ser. No. 09/149,709 entitled "METHOD AND SYSTEM FOR A MERCHANDISE CHECKOUT SYSTEM", assigned to the assignee herein named, filed on Sep. 9, 1998, and incorporated herein by reference.

BACKGROUND OF THE INVENTION

1. Field of the Invention

The present invention relates in general to data processing systems and, in particular, to an improved handheld merchandise scanner device. Still more particularly, the present invention relates to an improved handheld merchandise scanner device capable of accessing a product tag and determining a current status of a security tag included within the product tag.

2. Description of the Related Art

Large retail stores frequently have many checkout lanes in order to be able to handle higher customer throughput at peak periods. Such lanes tend to be crowded together as much as possible in an attempt to minimize the square footage required for the checkout function. Additionally, many of these lanes remain idle during a considerable portion of any given business day and waste the square footage allocated to them.

A modern retail or grocery store checkout lane typically includes a cash register that is used to check out merchandise items bearing bar code labels. A cashier removes items from a movable conveyor belt one at a time, drags them across the laser beam of a fixed scanner (e.g., a "slot" scanner built into a horizontal counter), and places them on a shopping carrier, such as a cart.

Store products, or items, include a bar code which uniquely identifies the product. The bar code may be scanned by a fixed scanner which is linked with a processor, e.g., a CPU built into the cash register, that translates the bar code symbol on a product into a cash register entry including the price of the scanned item. The product includes no indication regarding whether or not it has been purchased. Therefore, store personnel are unable to distinguish the purchased items from those which have not been purchased.

In one known system, security tags are included on a product in close proximity to the product's bar code. The security tag is deactivated when the bar code is scanned in order to indicate that the product has been purchased. A security station exists for systems such as this, typically at the front of the store, where store personnel may determine whether or not a product has a deactivated security tag.

A problem arises, however, when a customer wishes to determine the price, weight, or other product information associated with the product by scanning the product's bar code without purchasing the product. In order for the customer to determine the product information, the bar code, along with the security tag, must be scanned, thus deactivating the security tag resulting in the purchase of the product by the customer.

Store personnel are unable to determine whether a product has a deactivated security tag by visually inspecting the product. Therefore, when store personnel wish to determine whether a product has a deactivated security tag, they must take the product to a security station. Store personnel are unable to determine whether a product has an activated security tag while they are located remotely in the store.

Therefore, a need exists for a handheld scanner capable of scanning a product tag which includes a security tag without deactivating the security tag.

SUMMARY OF THE INVENTION

An improved handheld merchandise scanning device and method are disclosed. A first and second mode are enabled in the scanning device for scanning a product tag which includes product information and a security tag. The product tag is scanned utilizing the scanning device in the first mode to obtain the product information without deactivating the security tag. The product tag is scanned utilizing the scanning device in the second mode to concurrently obtain the product information and deactivate the security tag.

The above as well as additional objectives, features, and advantages of the present invention will become apparent in the following detailed written description.

DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

A preferred embodiment of the present invention and its advantages are better understood by referring to FIGS. 1–6 of the drawings, like numerals being used for like and corresponding parts of the accompanying drawings.

The present invention is an improved handheld scanning device for scanning a product tag which includes product information and a security tag without deactivating the security tag. The scanner includes a mode switch for selecting either a scan mode or a purchase mode. When the scan mode is selected, the scanner may be utilized to scan the product tag without deactivating the security tag. When the purchase mode is selected, the security tag is deactivated once the product tag is scanned.

The security tag includes an inductor, capacitor, and fuse and is responsive to a receipt of a signal having a particular frequency. The security tag circuit does not respond to signals having frequencies other than the particular frequency. When the fuse has been blown, the security tag will be considered to be deactivated. When the fuse is intact, the security tag will be considered to be activated. When a signal having the particular frequency transmitted at a high power level is received, the fuse will be blown, thus deactivating the security tag. When a signal having the same particular frequency, but transmitted at a lower power is received, the circuit will resonate but the fuse will not be blown. Thus the security tag will remain activated.

Figure 1:
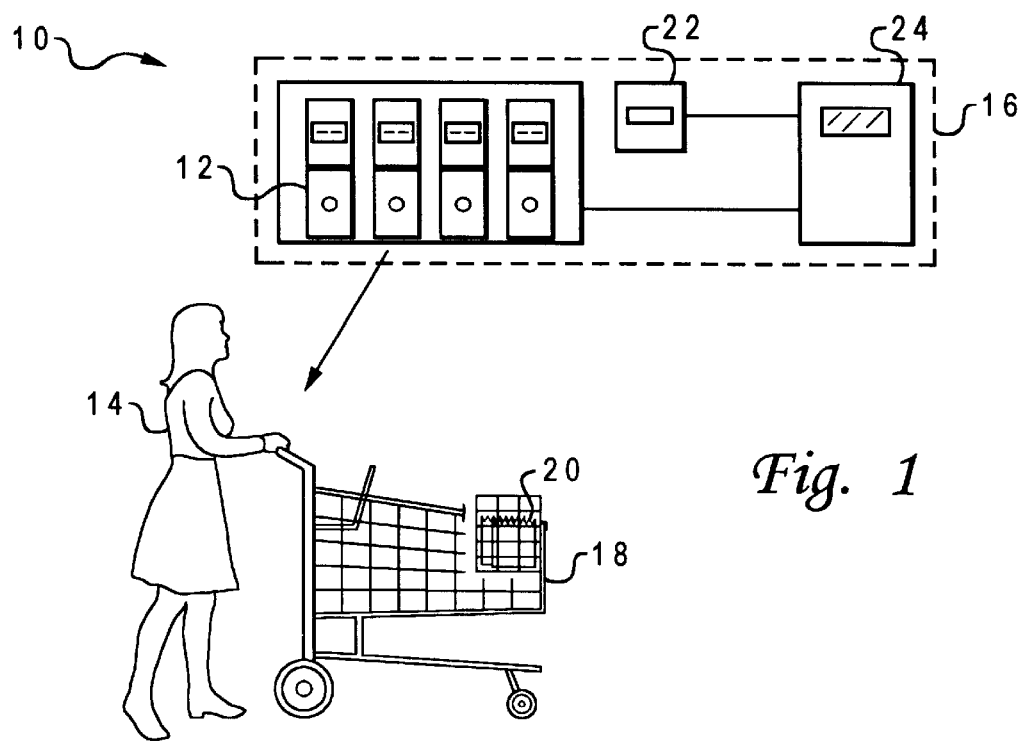
FIG. 1 is a block diagram of a starting point for a merchandise checkout system in accordance with the method and system of the present invention.

FIG. 1 is a block diagram of a merchandise checkout system 10 in accordance with the method and system of the present invention. The merchandise checkout system 10 includes remote scanning devices 12 which may be delivered to purchaser 14 at a check-in station 16. A purchaser 14 may pick up a shopping cart 18 and bags 20 for the placement of products chosen by the purchaser 14. As will be more fully described below, the remote scanning device 12 is operable to read product information from coded levels on items or products chosen by the purchaser 14.

Reading a product tag from the coded levels utilizing the scanner is defined as "scanning". In the preferred embodiment, scanning is accomplished utilizing infra-red technology. However, those skilled in the art will recognize that other methods exist for reading product tag.

Check-in station 16 includes a reader 22 for accepting discount coupons, not shown, from the purchaser 14 and transferring this information from the coupons to a central processor or computer system 24 for adjusting the indexing price information for use with the remote scanning device 12 utilized by the purchaser 14.

Figure 2:
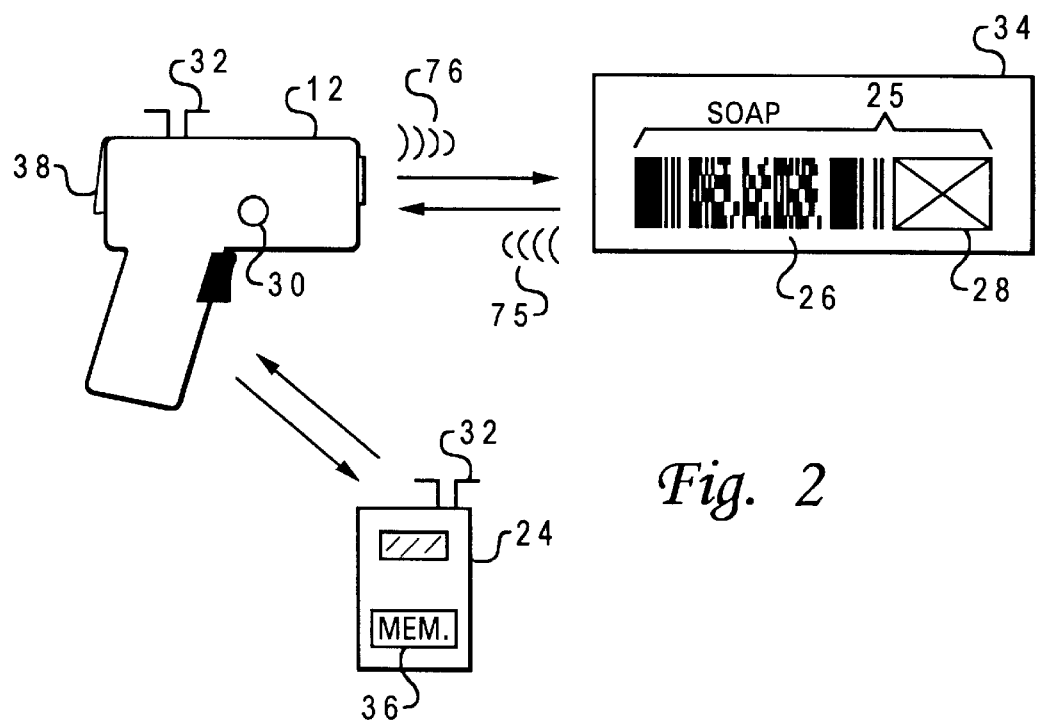
FIG. 2 is a block diagram of a remote scanning device 12 reading a product tag device 34 and transmitting the product information to computer system 24 in accordance with the method and system of the present invention.

FIG. 2 is a block diagram of a remote scanning device 12 reading a product tag device 34 and transmitting the product information to computer system 24 in accordance with the method and system of the present invention. Remote scanning device 12 is capable of reading product tags, such as product tag 25. Each product tag 25 includes both a product information 26 and a security tag 28. Product information 26 and security tag 28 are physically located in close proximity such that when a signal from remote scanning device 12 impinges on either product information 26 or security tag 28, the signal will also impinge on security tag 28 or product information 26. Product information 26 is read by remote scanning device 12 from coded levels on products 34 chosen by the purchaser 14. This product information 26 may be sent to computer system 24 by any wireless telecommunication techniques known in the data communication arts. By way of example, the coded levels may be industry standard bar codes read by infra-red technology.

Computer system 24 has a memory 36, which stores and indexes price information and weight for each product 34 based on the product identity information 26. Once product tag 25 is scanned by remote scanning device 12, remote scanning device 12 will transmit the bar code data to computer system 24. Computer system 24 will look up the price and other information associated with this bar code data and transmit it back to remote scanning device 12 where it is shown on a display 38 for the purchaser's 14 use.

Product tag 25 on the products 34 further includes a security tag device 28. Security tag device 28, shown in detail in FIG. 5, may be deactivated by the remote scanning device 12, or its status may be read by remote scanning device 12.

Remote scanning device 12 and computer system 24 each include a radio frequency (RF) transceiver 32 so that remote scanning device 12 and central processor 24 are coupled to each other for data communication. In accordance with the method of the present invention, the purchaser 14, utilizes remote scanning device 12 to analyze product tag 26 which then transmits product information 26 to be received by the central processor 24.

Additionally, computer system 24 has included in memory 36 the weight of each product 34 in association with the product information 26 wherein computer system 24 and remote scanning device 12 are operable in conjunction with each other to accumulate a weight transaction from a series of products 34 presented for purchase. Also, the remote scanning device 12 further includes an indication such as a short beep through a speaker 30 for notifying the purchaser 14 that a successful read of the product identity information 26 and deactivation of the security tag device 28 has been accomplished.

Figure 3A:
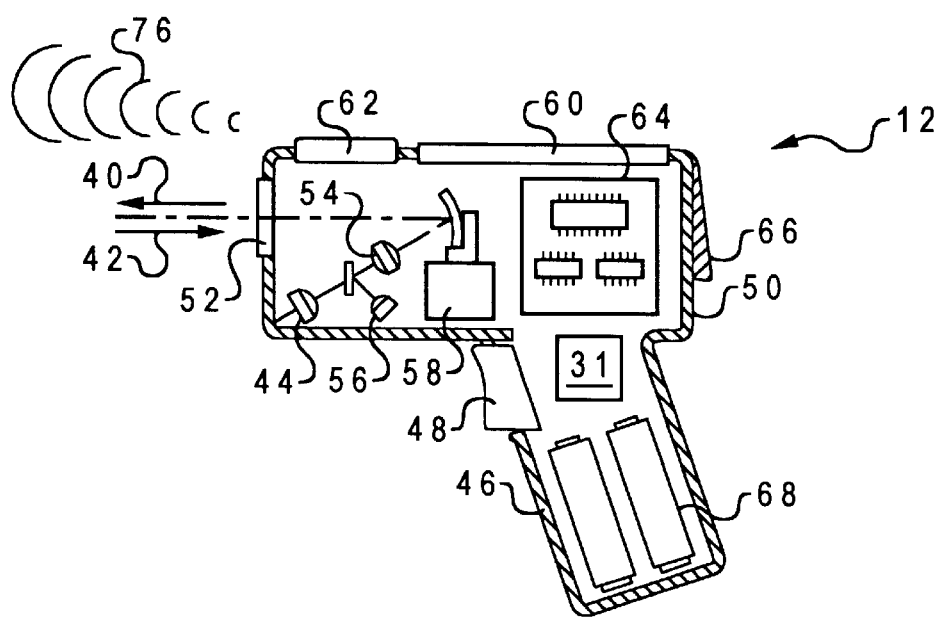
FIG. 3A is a sectional view of a remote scanning device in accordance with the method and system of the present invention.

FIG. 3A is an illustration of a remote scanning device 12 for use in accordance with the method and system of the present invention. An outgoing light beam 40 is generated in remote scanning device 12, usually as a laser diode or the like, and directed to impinge on a bar code symbol 26 a few inches from the front of remote scanning device 12. The outgoing beam 40 is scanned in a fixed linear pattern. The purchaser 14 positions remote scanning unit 12 so that this scan pattern traverses bar code symbol 26 to be read. Reflected light 42 from the symbol is detected by a light-responsive device 44 in remote scanning unit 12, producing serial electrical signals to be processed for identifying bar code symbol 26.

Remote scanning device 12 may be designed as a gun-shaped device having a pistol grip type of handle 46, wherein a movable trigger 48 is employed to allow the purchaser 14 to activate the light beam 40 and incased detector circuitry when pointed at the bar code symbol 26 to be read, thereby saving battery life if the unit is self powered. A lightweight plastic housing 50 contains the laser light source, the detector 44, and the optics and signal processing circuitry for use with the RF transceiver 32 of FIG. 2, as well as a battery. A light window 52 in the front end of the housing 50 allows the outgoing light beam 40 to exit and the incoming reflected light 42 to enter.

Remote scanning device 12 also includes a lens 54 used to collimate and focus the scanned beam into the bar code symbol 26 at the proper depth of field. Additionally, a light source 56 such as a semiconductor diode; and an oscillating mirror attached to a scanning motor 58 are activated when the trigger 48 is pulled. The electronic components for translating, storing, and sending the total price to a display screen 66 are mounted on one or more small circuit boards 64 within the housing 50. The batteries 68 are enclosed to provide a self-contained portable unit. The antenna may be printed on one of the circuit boards 64.

Figure 4:
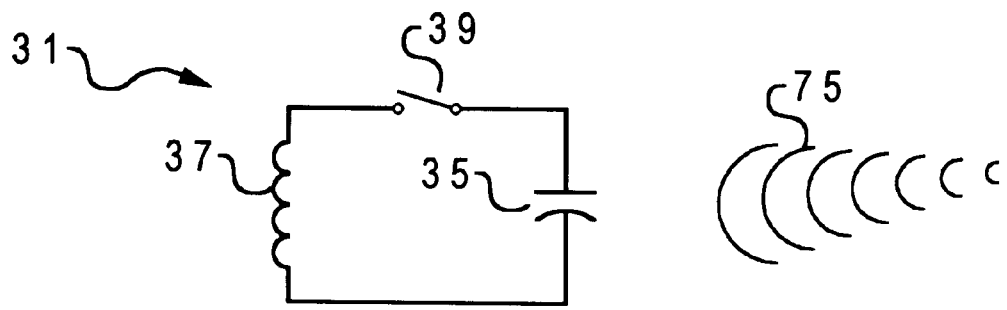
FIG. 4 is a circuit diagram of a status detection circuit in accordance with the method and system of the present invention.

Remote scanning device 12 includes a status detection circuit 31, shown in more detail in FIG. 4.

Figure 3B:
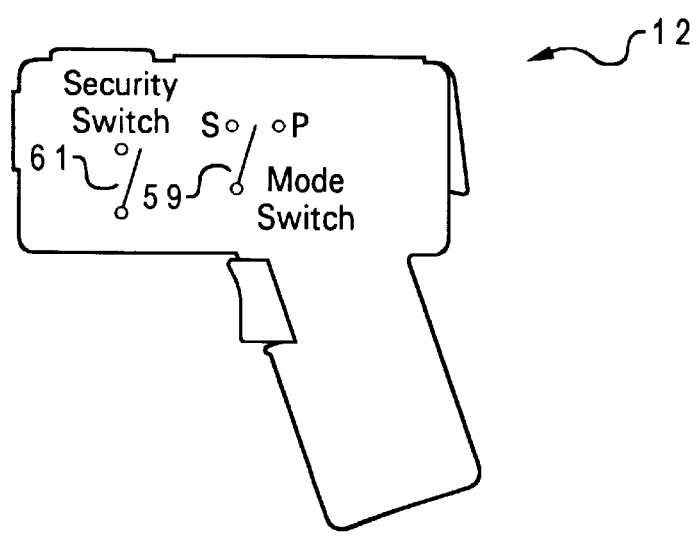
FIG. 3B is a side view of the remote scanning device of FIG. 3A in accordance with the method and system of the present invention.

FIG. 3B is a side view of the remote scanning device of FIG. 3A in accordance with the method and system of the present invention. Remote scanning device 12 also includes a mode switch 59 and a security switch 61. Mode switch 59 is utilized to select either a "scan" mode or a "purchase" mode. When "scan" mode is selected utilizing mode switch 59, remote scanning device 12 reads and displays product information 25 included within product tag 26 without deactivating security tag 28. When "purchase" mode is selected utilizing mode switch 59, remote scanning device 12 reads and displays product information 25 included within product tag 26 and also deactivates security tag 28.

When security switch 61 is closed, remote scanning device 12 is capable of determining the current status of security tag 28 to determine whether security tag 28 is currently activated or deactivated.

FIG. 4 is a circuit diagram of a status detection circuit in accordance with the method and system of the present invention. Status detection circuit 31 includes a capacitor 35, an inductor 37, and a switch 39 connected together in electrical series. When security switch 61 is open, circuit 31 will not operate.

When security switch 61 is closed and a scan is activated, scanner 12 will transmit a low power signal to security tag 28. Resonating circuit 78 will then excite and oscillate if security tag 28 is activated. In response to the oscillation of circuit 78, if circuit 31 is in close physical proximity to circuit 78, circuit 31 will receive signal 75 and will oscillate indicating that security tag 28 is activated. If security tag 78 has been deactivated, circuit 78 will not resonate, and thus circuit 31 will not resonate indicating that security tag 78 has been deactivated.

Figure 5:
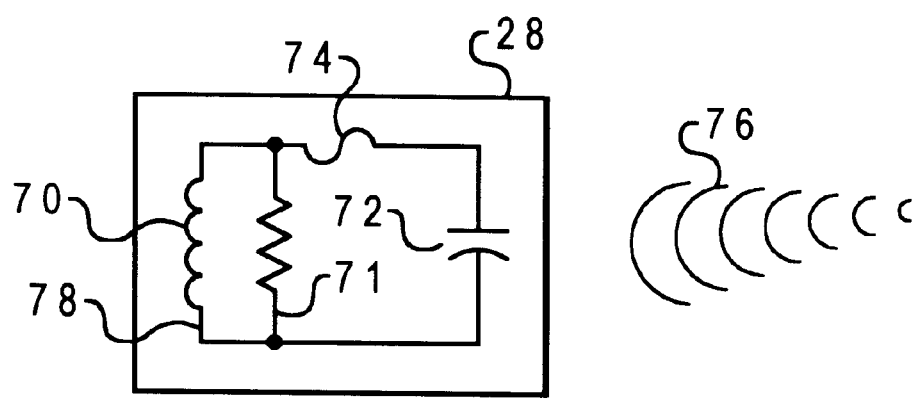
FIG. 5 is a circuit diagram of a security tag device included within a product tag device in accordance with the method and system of the present invention.

FIG. 5 illustrates one embodiment for a security tag device 28 and a method to deactivate it in accordance with the present invention. Security tag device 28 includes a resonating circuit 78 having an inductor 70, a capacitor 72, and a fuse 74 connected together in electrical series. In operation, the circuit 78 is designed to resonate at a particular electromagnetic frequency. If a high power electromagnetic wave 76 impinges on the circuit, the circuit will excite and generate enough current to blow the fuse 74 thereby disabling the electrical circuit 78 and deactivating the security tag device 28. If a low power electromagnetic wave 76 impinges on the circuit, the circuit will excite, but will not generate enough current to blow fuse 74.

It should be appreciated by those skilled in the art that the electrical circuit 78 might be fabricated using discrete components, Mylar techniques or other thin film applications known in the electrical arts. Remote scanning device 12 includes RF circuitry 60 to produce a high power signal having a frequency at a high power, and also able to produce a low power signal having the same frequency but at a low power.

A short oscillating pulse 76 from remote scanning device 12 induces oscillations in circuit 78 having a frequency determined by the value selected for inductor (L) 70 and capacitor (C) 72 in FIG. 5, the frequency being inversely proportional to the square root of the product of L and C, as expressed by $f=1/(2\pi\sqrt{LC})$. An example frequency of operation of 100 MHz could be achieved using a 20 picofarad capacitor for capacitor 72 and a 126 nanohenry inductor for inductor 70. However, those skilled in the art will recognize that other suitable values may be chosen for both capacitor 72 and inductor 70 to yield either the same frequency of oscillation, or to select a different frequency of operation.

The low power level of the exciting pulse 76 to avoid blowing fuse 74, and the high power level to blow fuse 74, would be selected based on the sensitivity chosen for fuse 74 and the desired proximity of remote scanning device 12. The energy level of pulse 76 must also meet FCC regulations for electromagnetic radiation. The low power level must be a power such that circuit 78 will excite but will not blow fuse 74. The high power level must be a power such that circuit 78 will excite and will blow fuse 74.

A resistor 71 (shown in FIG. 5) is utilized to control the Q value of the circuit according to the expression $Q=R(\sqrt{C/L})$, where C is capacitor 72 and L is inductor 70, also shown in FIG. 5. An example value for R would be 1 k ohms. By controlling the Q value of the circuit, the sensitivity to a particular frequency and degree of oscillations and resulting current levels can be controlled in the circuit of FIG. 5.

Figure 6:
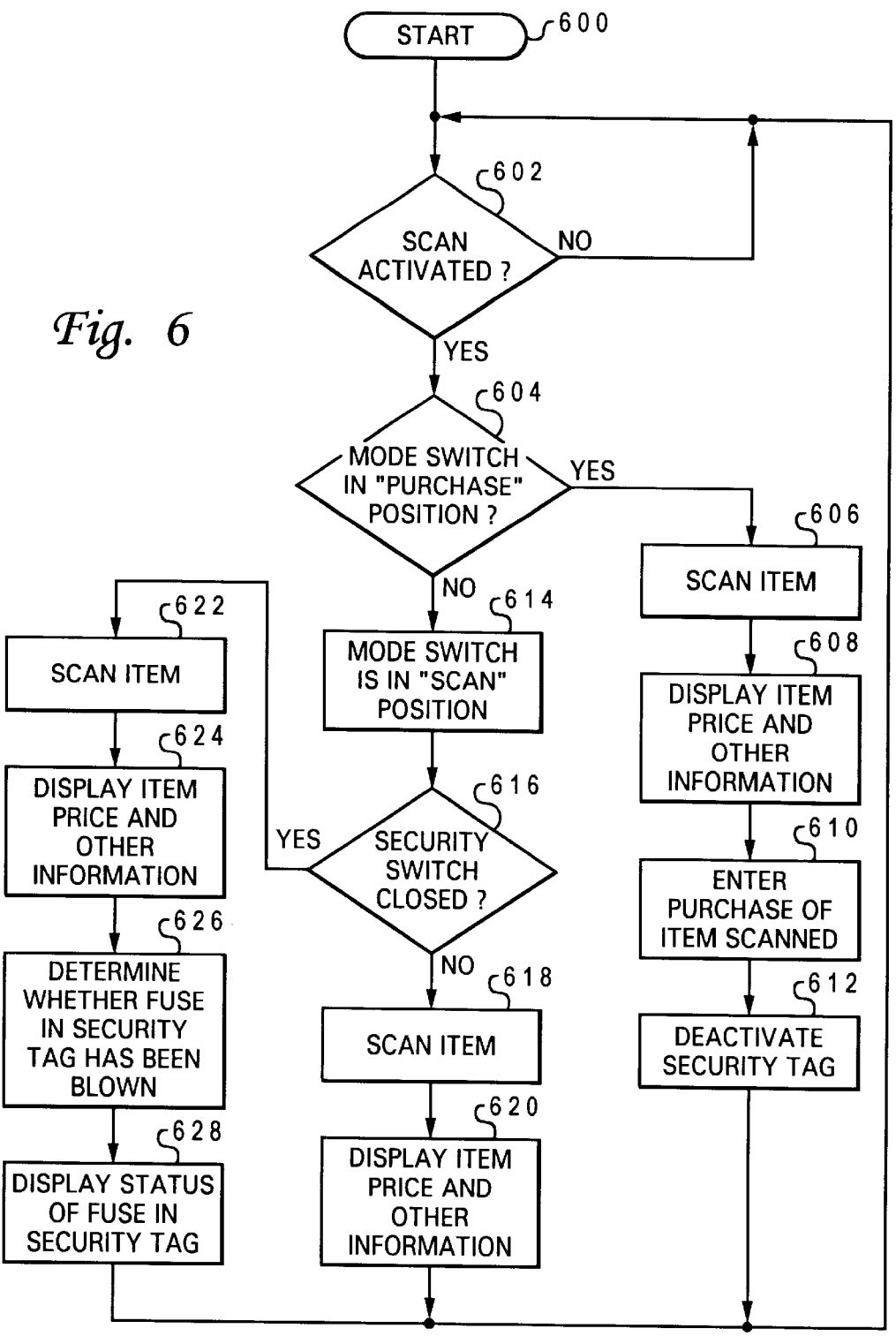
FIG. 6 is a high level flow chart which illustrates executing scan, purchase, and status operations utilizing the remote scanning device of FIGS. 3A and 3B in accordance with the method and system of the present invention.

FIG. 6 is a high level flow chart which illustrates executing scan, purchase, and status operations utilizing a remote scanning device in accordance with the method and system of the present invention. The process starts as depicted at block 600 and thereafter passes to block 602 which illustrates a determination of whether or not a scan utilizing the remote scanning device has been activated. If a determination is made that a scan has not been activated, the process passes back to block 602 until a scan is activated. Referring again to block 602, if a determination is made that a scan has been activated, the process passes to block 604 which depicts a determination of whether or not the mode switch is in the "purchase" position. If a determination is made that the mode switch is in the "purchase" position, the process passes to block 606 which illustrates scanning the product tag associated with an item.

The process then passes to block 608 which depicts the scanner displaying the item price and the other product information stored in the product tag. Next, block 610 illustrates entering the purchase of the scanned item by transmitting the product information to computer 24. The process then passes to block 612 which depicts the deactivation of the security tag. The process then passes to block 602.

Referring again to block 604, if a determination is made that the mode switch is not in the purchase position, the process passes to block 614 which depicts the mode switch being in the scan position. The process then passes to block 616 which illustrates a determination of whether or not the security switch is closed. If a determination is made that the security switch is not closed, the process passes to block 618 which depicts scanning the item by reading the product tag. Next, block 620 illustrates displaying the item price and other product information stored within the product tag. The process then passes back to block 602.

Referring again to block 616, if a determination is made that the security switch is closed, the process passes to block 622 which depicts scanning the item by reading the product tag. Next, block 624 depicts displaying the item price and other information stored within the product tag. Thereafter, block 626 illustrates determining whether the fuse included within the security tag has been blown. Next, block 628 depicts displaying the status of the fuse in the security tag. The process then passes back to block 602.

While a preferred embodiment has been particularly shown and described, it will be understood by those skilled in the art that various changes in form and detail may be made therein without departing from the spirit and scope of the present invention.

What is claimed is:

1. A method in a handheld merchandise scanning device, said method comprising the steps of:
    enabling a first and second mode in said scanning device of scanning a product tag which includes product information and a security tag;
    scanning said product tag utilizing said scanning device in said first mode to obtain said product information without deactivating said security tag;

scanning said product tag utilizing said scanning device in said second mode to obtain said product information and deactivating said security tag;

enabling a third scan mode in said scanning device; and scanning said product tag utilizing said scanning device in said third mode to determine a status of said security tag without deactivating said security tag.

2. The method according to claim 1, further comprising the step of enabling said first and second mode in said scanning device of scanning a product tag which includes product information and said security tag, wherein said security tag is responsive only to signals having a particular frequency.

3. The method according to claim 1, further comprising the step of providing said security tag capable of being deactivated by signals having only said particular frequency transmitted at least at a first power level, wherein said security tag remains activated in response to a receipt of signals having said particular frequency and a second power level, wherein said second power level is less than said first power level.

4. The method according to claim 3, further comprising the steps of:

transmitting a first signal having said frequency at a first power level utilizing said handheld scanning device to said product tag in response to said enabling of said second mode;

deactivating said security tag in response to a receipt of said first signal; and displaying said product information utilizing said handheld scanning device.

5. The method according to claim 4, further comprising the steps of:

transmitting a second signal having said frequency at second power level utilizing said handheld scanning device to said product tag in response to said enabling of said first mode; and displaying said product information utilizing said handheld scanning device.

6. The method according to claim 5, further comprising the steps of:

transmitting a third signal having said frequency at said second power level utilizing said handheld scanner in response to said enabling of said third mode; and displaying a status of said security tag in response to said transmission of said third signal.

7. The method according to claim 6, further comprising the step of providing a status circuit included within said scanning device, said status circuit being responsive to signals having said particular frequency.

8. The method according to claim 7, further comprising the steps of:

receiving a return signal from said security tag in response to said security tag being activated upon said security tag receiving said third signal;

causing said status circuit to resonate in response to a receipt of said return signal; and displaying an indication of said security tag being activated in response to said status circuit resonating.

9. A method in a handheld merchandise scanning device, said method comprising the steps of:

permitting a selection of a scan operation utilizing said handheld scanning device for scanning a product tag which includes a security tag, said security tag being responsive only to signals having a particular frequency;

transmitting a first signal having said frequency at a first power level utilizing said handheld scanner in response to a selection of said scan operation to said product tag, said first power level being insufficient to deactivate said security tag;

receiving a return signal from said product tag while said security tag remains activated;

displaying said product information utilizing said handheld scanning device in response to a receipt of said return signal;

permitting a selection of a purchase operation;

transmitting a second signal having said frequency at a second power level utilizing said handheld scanning device in response to a selection of said purchase operation;

deactivating said security tag in response to a receipt of said second signal;

receiving a second return signal from said product tag;

displaying said product information utilizing said handheld scanning device in response to a receipt of said second return signal; and determining a current status of said security tag while said security tag remains activated.

10. The method according to claim 9, wherein the step of determining a current status of said security tag further comprises the steps of:

permitting a selection of a status operation;

transmitting a third first signal having said frequency at a first power level utilizing said handheld scanner in response to a selection of said status operation to said product tag; and displaying a status of said security tag in response to said transmission of said third signal.

11. The method according to claim 10, further comprising the step of providing said security tag capable of being deactivated by signals having only said particular frequency transmitted at said second power level, wherein said security tag remains activated in response to a receipt of signals having said particular frequency and said first power level.

12. The method according to claim 11, further comprising the step of providing a status circuit included within said scanning device, said status circuit being responsive to signals having said particular frequency.

13. The method according to claim 12, further comprising the steps of:

receiving a third return signal from said security tag in response to said security tag being activated;

causing said status circuit to resonate in response to a receipt of said third return signal; and displaying an indication of said security tag being activated in response to said status circuit resonating.

14. The method according to claim 13, further comprising the step of displaying an indication of said security tag being inactivated in response to a failure of said status circuit to resonate.

15. A handheld merchandise scanning device, comprising:

a first and second mode for scanning a product tag which includes product information and a security tag;

means for scanning said product tag utilizing said scanning device in said first mode to obtain said product information without deactivating said security tag;

means for scanning said product tag utilizing said scanning device in said second mode to obtain said product information and deactivating said security tag;

a third scan mode; and means for scanning said product tag utilizing said scanning device in said third mode to determine a status of said security tag without deactivating said security tag.

16. The device according to claim 15 further comprising means for enabling said first and second mode in said scanning device of scanning a product tag which includes product information and said security tag, wherein said security tag is responsive only to signals having a particular frequency.

17. The device according to claim 16, further comprising means for providing said security tag capable of being deactivated by signals having only said particular frequency transmitted at least at a first power level, wherein said security tag remains activated in response to a receipt of signals having said particular frequency and a second power level, wherein said second power level is less than said first power level.

18. The device according to claim 17, further comprising:
means for transmitting a first signal having said frequency at a first power level utilizing said handheld scanning device to said product tag in response to said enabling of said second mode;
means for deactivating said security tag in response to a receipt of said first signal; and
means for displaying said product information utilizing said handheld scanning device.

19. The device according to claim 18, further comprising:
means for transmitting a second signal having said frequency at second power level utilizing said handheld scanning device to said product tag in response to said enabling of said first mode; and
means for displaying said product information utilizing said handheld scanning device.

20. The device according to claim 19, further comprising:
means for transmitting a third signal having said frequency at said second power level utilizing said handheld scanner in response to said enabling of said third mode; and
means for displaying a status of said security tag in response to said transmission of said third signal.

21. The device according to claim 20, further comprising means for providing a status circuit included within said scanning device, said status circuit being responsive to signals having said particular frequency.

22. The device according to claim 21, further comprising:
means for receiving a return signal from said security tag in response to said security tag being activated upon said security tag receiving said third signal;
means for causing said status circuit to resonate in response to a receipt of said return signal; and
means for displaying an indication of said security tag being activated in response to said status circuit resonating.

23. A handheld merchandise scanning device, comprising:
a mode selection switch for selecting a scan mode or a purchase mode;
means for scanning a product tag in response to a selection of said scan mode whereby a security tag remains activated during said scanning, wherein said security tag is responsive only to signals having a particular frequency;

means for deactivating said security tag in response to a selection of said purchase mode;
means for transmitting a first signal having said frequency at a first power level utilizing said handheld scanner in response to a selection of said scan mode to said product tag, said first power level being insufficient to deactivate said security tag;
means for receiving a first return signal from said product tag while said security tag remains activated;
means for displaying said product information utilizing said handheld scanning device in response to a receipt of said first return signal;
means for transmitting a second signal having said frequency at a second power level utilizing said handheld scanning device in response to a selection of said purchase mode;
means for deactivating said security tag in response to a receipt of said second signal;
means for receiving a second return signal from said product tag;
means for displaying said product information utilizing said handheld scanning device in response to a receipt of said second return signal; and
means for determining a current status of said security tag while said security tag remains activated.

24. The scanning device according to claim 23, wherein said means for determining a current status of said security tag further comprises:
a status switch;
means for transmitting said first signal having said frequency at a first power level utilizing said handheld scanner in response to said status switch being switched on; and
means for displaying a status of said security tag in response to said transmission of said first signal.

25. The scanning device according to claim 24, further comprising said security tag being capable of being deactivated by signals having only said particular frequency transmitted at said second power level, wherein said security tag remains activated in response to a receipt of signals having said particular frequency and said first power level.

26. The scanning device according to claim 25, further comprising a status circuit included within said scanning device, said status circuit being responsive to signals having said particular frequency.

27. The scanning device according to claim 26, further comprising:
means for receiving a third return signal from said security tag in response to said security tag being activated;
said status circuit resonating in response to a receipt of said third return signal; and
means for displaying an indication of said security tag being activated in response to said status circuit resonating.

28. The scanning device according to claim 27, further comprising means for displaying an indication of said security tag being inactivated in response to a failure of said status circuit to resonate.

* * * * *